United States Patent [19]
Takiura

[11] 3,876,736
[45] Apr. 8, 1975

[54] METHOD OF MOLDING SYNTHETIC RESINS THROUGH HIGH-PRESSURE FLUID CROSS-LINKING PROCESS AND RELEVANT APPARATUS

[75] Inventor: Mamoru Takiura, Kawasaki, Japan

[73] Assignee: Ikegai Tekko Kabushiki Kaisha, Tokyo, Japan

[22] Filed: Sept. 18, 1972

[21] Appl. No.: 289,993

[30] Foreign Application Priority Data
Sept. 30, 1971 Japan............................ 46-75818

[52] U.S. Cl................ 264/40; 264/176 R; 264/211; 264/329; 264/349; 425/145; 425/378
[51] Int. Cl............................................. B29g 2/00
[58] Field of Search......... 264/40, 176 R, 328, 174, 264/329, 211, 349, 99, 25; 425/145, 378, 379, 204, 243, 244

[56] References Cited
UNITED STATES PATENTS
| | | | |
|---|---|---|---|
| 2,505,540 | 4/1950 | Goldhard | 425/145 |
| 3,158,901 | 12/1964 | Westover | 425/378 |
| 3,288,903 | 11/1966 | Hendry | 264/329 |
| 3,591,674 | 7/1971 | Engel | 264/329 |
| 3,660,552 | 5/1972 | Hinz et al. | 264/25 |
| 3,706,827 | 12/1972 | Nott et al. | 264/349 |

*Primary Examiner*—Jeffery R. Thurlow
*Attorney, Agent, or Firm*—Woodhams, Blanchard & Flynn

[57] ABSTRACT

A method of molding a synthetic resin which comprises: kneading a mixture obtained by dispersing a cross-linking agent in said synthetic resin, while melting said resin, by applying such temperature and pressure as will not give rise to a cross-linking reaction, introducing the thus kneaded mixture into plural reaction chambers to effect cross-linking therein by applying an appropriate temperature and high pressure, and extruding the thus cross-linked material continuously from said reaction chambers through a head die for molding same; and a molding apparatus relevant to said method.

1 Claim, 11 Drawing Figures

METHOD OF MOLDING SYNTHETIC RESINS THROUGH HIGH-PRESSURE FLUID CROSS-LINKING PROCESS AND RELEVANT APPARATUS

BACKGROUND OF THE INVENTION

A. Field of the Invention

The present invention relates to an improvement in the method of producing uniform molded articles from a mixture of a synthetic resin and a cross-linking agent, as well as a molding apparatus pertaining to said method.

B. Description of the Prior Art

Cross-linking of a polyolefin resin, such as polyethylene, is usually performed by a procedure whereby a mixture obtained by uniformly dispersing a cross-linking agent in said polyethylene is first made into molded articles by means of an extrusion-molding machine, followed by a cross-linking process. As widely used known cross-linking processes, there are the high-pressure steam process, the high-temperature liquid process, the lead-encasing vulcanization process, the Grace's process, radiation process, etc.; each process having merits and demerits. In addition, there has recently been developed a new cross-linking process called Engel's process. According to Engel's process, a cross-linking agent is mixed with a thermoplastic material within a screw-driven extruding machine, the resulting mixture is introduced into a pressure chamber to be compressed under a pressure of 2,000 Kg/cm² instantaneously to effect uniform dispersion of said cross-linking agent without giving rise to the cross-linking reaction, and then the thus treated mixture is passed through a die held at a temperature high enough to effect the cross-linking reaction to thereby accomplish the desired cross-linking. An object of this process is to achieve uniform dispersion of the cross-linking agent by means of said pressure chamber, and cross-linking by heating from the outside at the time of passing the mixture through said die. It is technically based on the conception that said thermoplastic material accquires a heat curing property after completion of the cross-linking reaction and is no longer suitable for molding or drawing. Consequently, molding by this process must be performed just before the material becomes unsuitable for molding or drawing and is therefore very unstable.

SUMMARY OF THE INVENTION

The present invention relates to a method of extruding a synthetic resin, such as polyolefin resin, polyvinyl chloride, etc., which comprises: kneading by means of a screw a mixture obtained by uniformly dispersing a cross-linking agent in said resin during melting of said material by applying such temperature and pressure as will not give rise to the cross-linking reaction, introducing the thus kneaded mixture into the reaction chamber to effect cross-linking therein by applying an appropriate temperature and high pressure, and extruding the thus cross-linked material continuously through a head die for molding purposes; and a molding apparatus relevant to said method. In this connection, the present apparatus is also applicable in the production of foamy moldings from a mixture of a synthetic resin and a foaming agent such as organic peroxides and the like.

A factor requisite for satisfactory realization of the function of an apparatus of this kind is to secure uniformity in size of the extruded moldings at the time when the material held in the main reaction chamber upon plasticizing by the screw is introduced into the plunger-type secondary reaction chamber and further extruded into the molding head die. And, in case of an apparatus employing a plural number of plungers, a particularly important thing is whether a change in size can be prevented at the time of switching the extrusion from one plunger to another. In other words, the operation is accompanied by various risks, such that: if it is so devised as to set one plunger in motion after another plunger has come to a halt, the extruded moldings will have distinct seams; and if it is so devised as to put a plural number of plungers in motion simultaneously for a certain period of time, the quantity of material being extruded will increase particularly during said period, resulting in a lack of uniformity in size of the moldings; and so on.

The present invention has as an object to avoid the foregoing troubles in the prior art. To be precise, an object is to provide a method of working a double plunger by automatically controlling the speed of the constituent plungers according to a prescribed velocity program in order to maintain the volume of the material to be extruded per unit time uniformly, and to provide a molding apparatus characterized in that it ensures a stable extrusion of the material in relation to the work of the transfer valves.

DESCRIPTION OF THE PREFERRED EMBODIMENTS

In the accompanying drawings.

Figure 1:
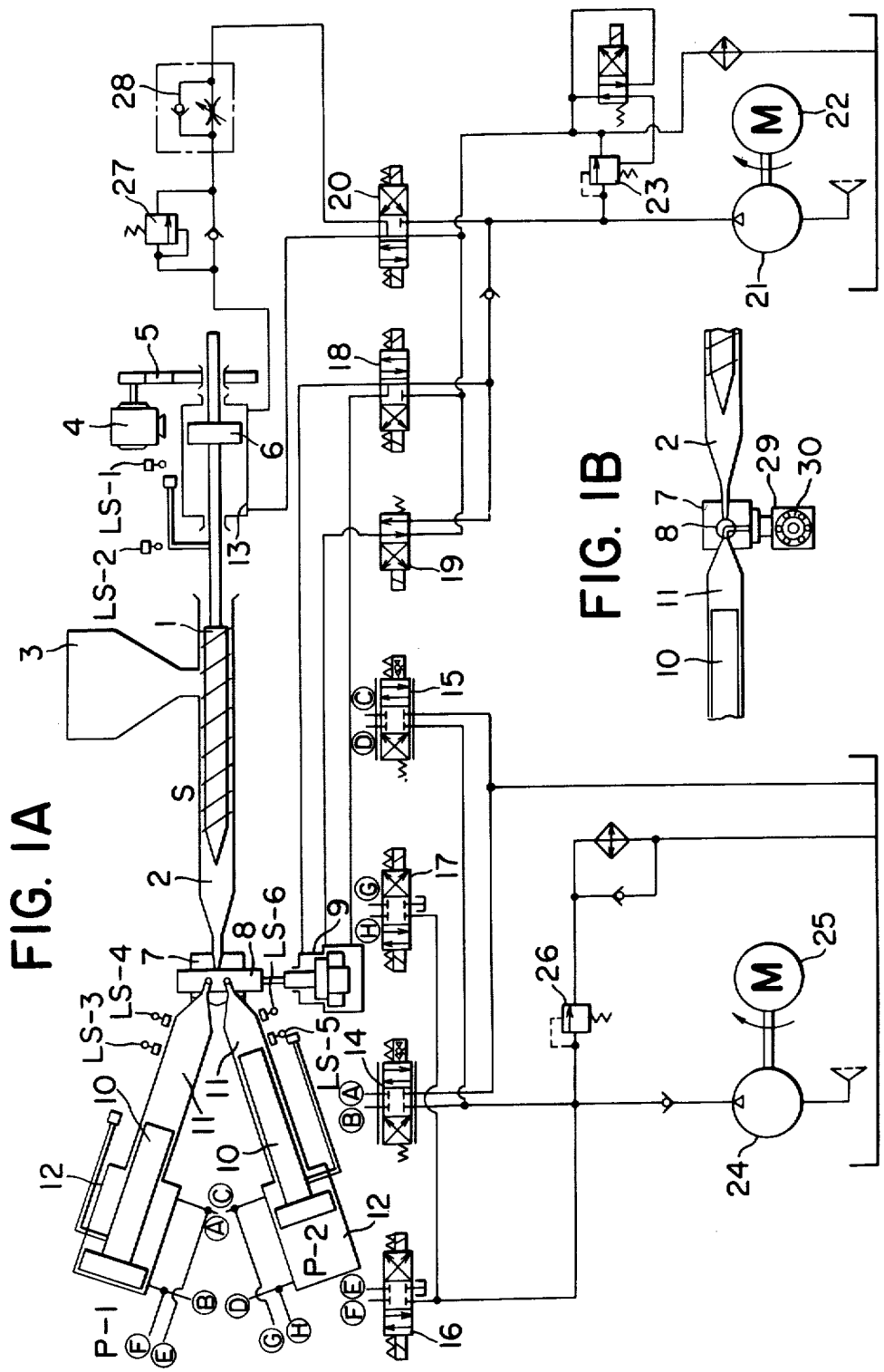
FIG. 1A is a schematic illustration of the overall structure of the machine including the pressure-oil circuit system of a high-pressure fluid cross-linking molding apparatus according to the present invention.
FIG. 1B is a detail drawing showing the transfer valve.
Figure 2:
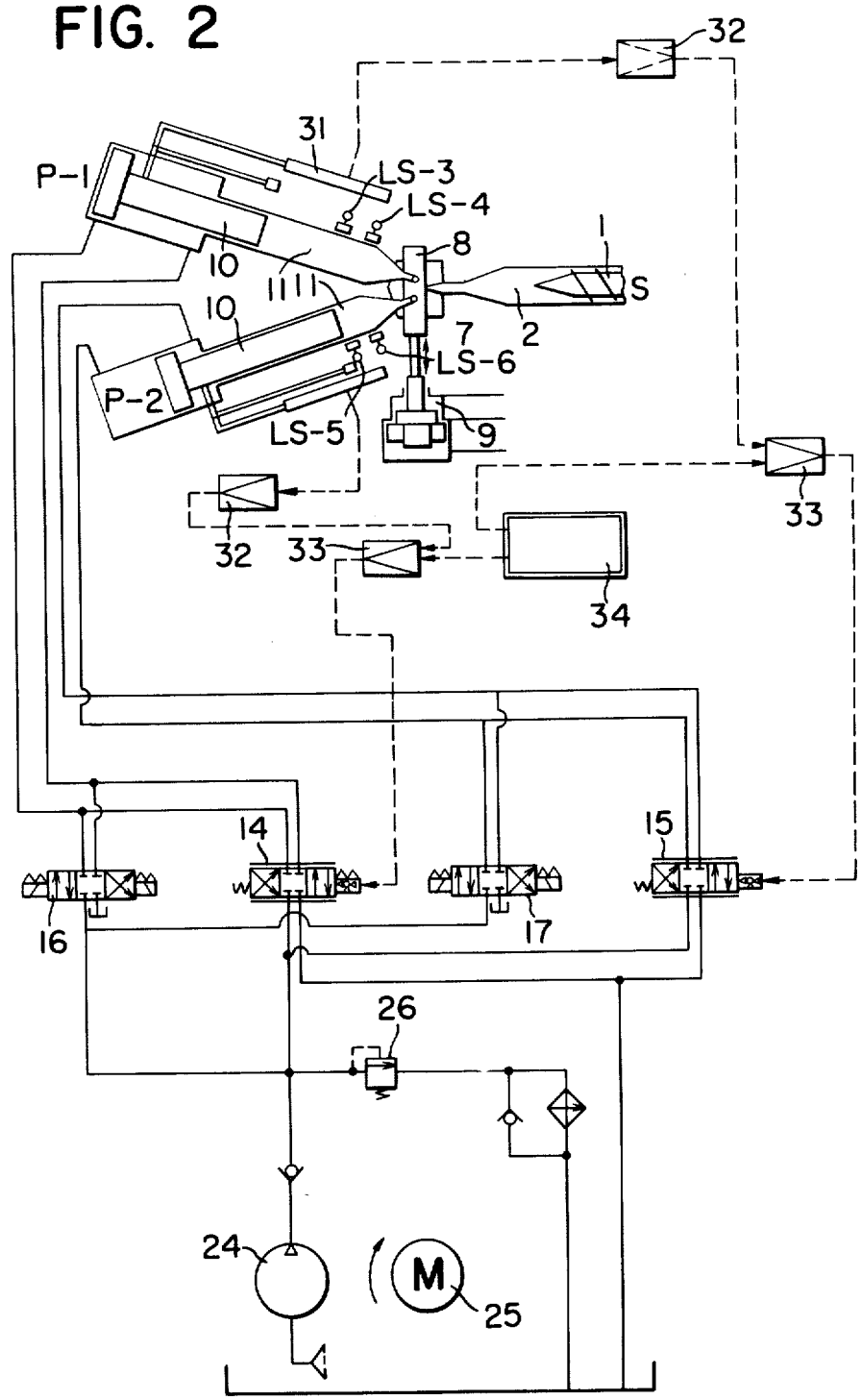
FIG. 2 is a detail drawing showing the structure of the plunger member as well as the transfer valve member, along with the pressure-oil circuit system and the electric control system therefor.
Figure 3A:
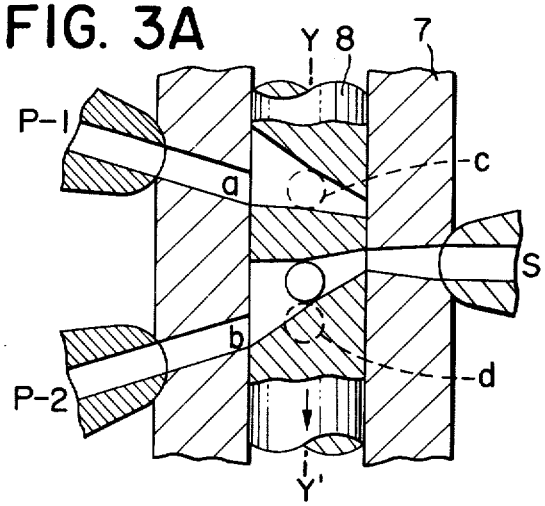
FIGS. 3A–3C are drawings showing the transverse section and longitudinal section of the transfer valve.
Figure 3A:
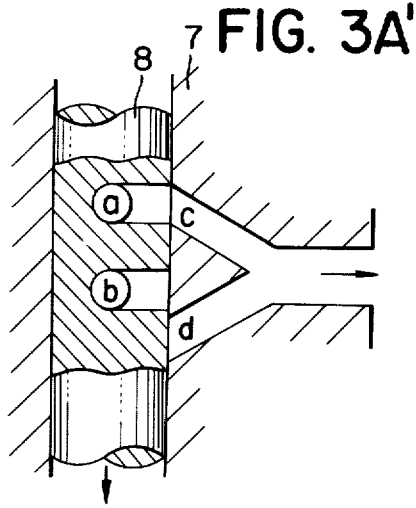
Figure 3B:
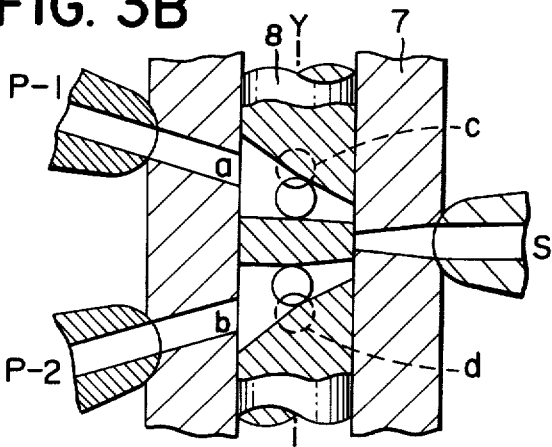
Figure 3B:
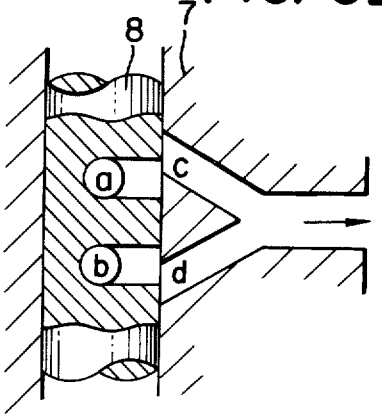
Figure 3C:
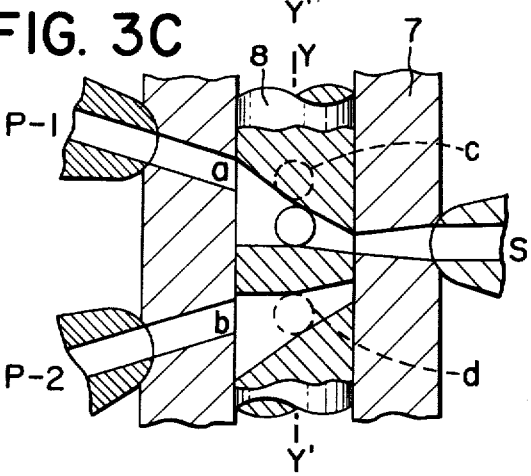
Figure 3C:
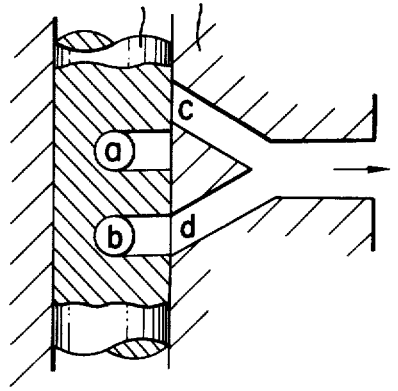

Referring to FIG. 1 and FIG. 2, the numeral reference 1 denotes the screw used for the purpose of plasticization and injection, 2 denotes the main reaction chamber to retain the plasticized material, 3 denotes the hopper, 4 denotes the electric motor to drive said screw, 5 denotes the reduction gear, 6 denotes the piston to push said screw, 7 denotes the transfer valve housing, 8 denotes the transfer valve, 9 denotes the two-stage special cylinder, 10 denotes the plunger, 11 denotes the secondary reaction chamber, 12 denotes the oil-pressure cylinder for the plunger, 13 denotes the oil-pressure cylinder for the screw, 14 denotes the servovalve for use in advancing the plunger P-1, 15 denotes the servovalve for use in advancing the plunger P-2, 16 and 17 are the solenoid valves to work when the plungers P-1 and P-2 are pushed back by the injection screw 1 — with the material between said screw and the respective plunger — under a pressure, 26 denotes the relief valve to control the oil pressure for the circuit at this juncture, and 24 and 25 denote the pump equipped for the pressure-oil circuit to work said plungers and the electric motor to drive said pump, respectively.

18 and 19 denote the solenoid valves for the two-stage special cylinder to work the transfer valve, 20 denotes the solenoid valve to work the piston 6 for the screw 1, 28 denotes the flux-controlling valve for the purpose of regulating the speed of screw when the piston 6 is pushed to advance the screw, 23 denotes the relief valve to control the oil pressure of the circuit at this juncture, 27 denotes the relief valve for the purpose of controlling the backpressure when the screw makes a back stroke while plasticizing the material, and 21 and 22 denote the pump equipped for the pressure-oil circuit to work said injection screw and transfer valve and the electric motor to drive said pump, respectively.

29 denotes the molding head die, 30 denotes the moldings, 31 denotes the detector to detect the positions of the plungers P-1 and P-2 in motion, and 32 denotes the amplifier to amplify the signal given by said detector.

34 denotes the automatic controller to instruct the motions of the plunger, and 33 denotes the amplifier to amplify the instruction signal directed to the servovalve.

Figure 4:
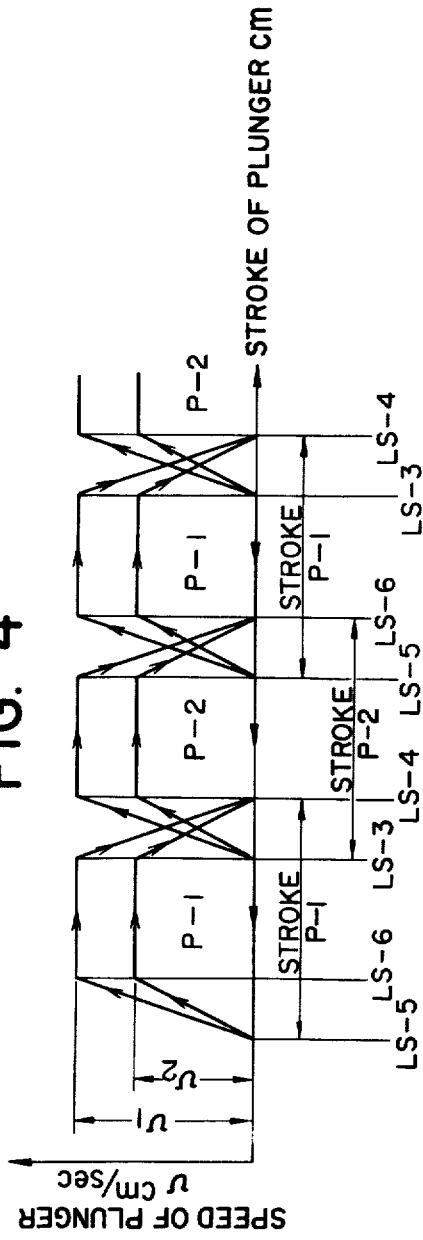
FIG. 4 is a diagrammatic representation of the relation between the stroke and the speed of the plunger.

The screw 1 is driven by the driving electric motor 4 and plasticizes the material. The thus plasticized material is extruded into the main reaction chamber 2, the pressure within said reaction chamber being held at a backpressure as set by the relief valve 27, and the screw 1 moves backward from the position of limit switch LS-2 to the position LS-1 and comes to a halt. While the screw is moving backward to thereby plasticize the material, the transfer valve 8 is in the state as shown in FIG. 3 (A). In the meantime, the plunger P-1 is advancing in accordance with the velocity program (See FIG. 4) as set by the automatic controller 34, and the material is being extruded by the molding head die. Subsequently, the injection screw pushes the material held in the main reaction chamber into the secondary reaction chamber 11 of the plunger P-2 through the transfer valve 8 by virtue of the pressure set by the relief valve 23. On this occasion, said plunger moves backward by virtue of the difference between the pressure set by the relief valve 26 and the pressure set by the relief valve 23 (it is essential that the pressure set by the relief valve 23 is higher than the pressure set by the relief valve 26).

When the plunger is moving backward, the material is in the state of being subjected to the pressure set by the relief valve 26.

Next, when the plunger P-1 advances to the position of the limit switch LS-3, the speed of the plunger P-1 reduces rectilinearly from a fixed speed v toward zero according to the signal of LS-3, while the speed of the plunger P-2 increases rectilinearly from zero toward a fixed speed v. By the signal of the limit switch LS-3, the position of the transfer valve shifts to the neutral position as shown in FIG. 3 (B). In this state, the plunger P-1 attains the speed of zero at the position of the limit switch LS-4 and comes to halt. And, by the signal of LS-4, the plunger P-2 attains a fixed speed v. By the signal of the limit switch LS-4, the position of the transfer valve shifts to the state as shown in FIG. 3 (C). Subsequently, the screw turns again and moves backward from the position of the limit switch LS-2 to the position LS-1 while performing plasticization of the material.

Figure 5:
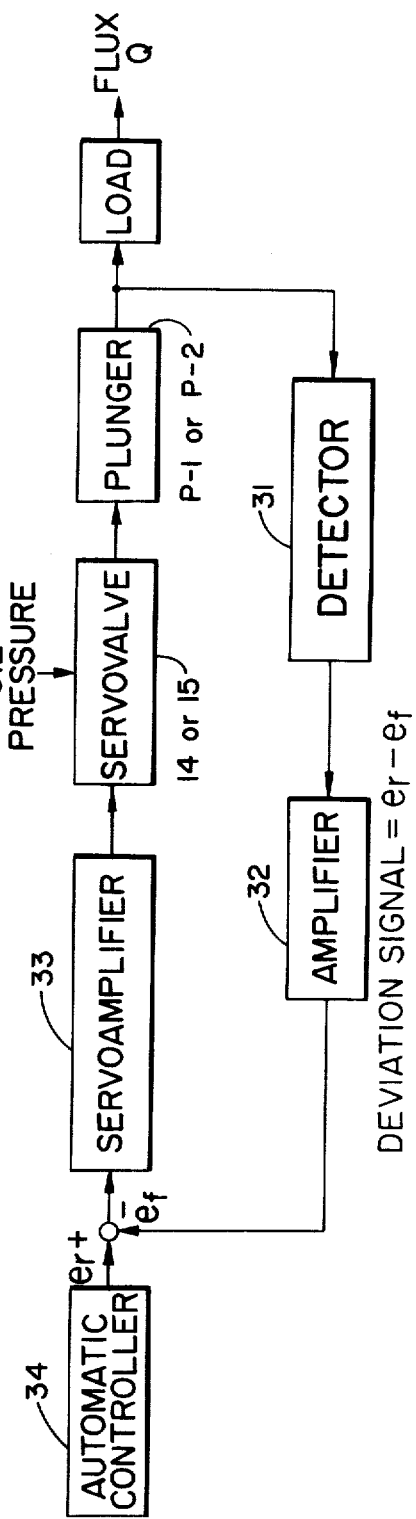
FIG. 5 is a diagrammatic representation of the control block for the electric and oil pressure servovalve mechanism.

The plungers P-1 and P-2 move in accordance with the velocity diagram (See FIG. 4) set by the automatic controller in advance. To be precise, when a set signal is given by the automatic controller 34, this signal is amplified by the servoamplifier 33 and enters the servovalve. The servovalve then supplies a flux in proportion to this signal to the oil pressure cylinder 12. In the event of the motion of the plunger being inconsistent with the set signal, the detector 31 detects the electric displacement and works to correct said electric displacement for the plunger until the deviation signal indicates zero. FIG. 5 is a block diagram to represent the electric control system for this purpose.

The apparatus according to the present invention has such a merit that, because of its being so devised as to control the speed of plungers by a single automatic controller by virtue of the servovalve and give diagonally opposite signals to a double plunger by the set of limit switches LS-3, LS-4, and the set of limit switches LS-5, LS-6, a regular cycle of the material can be attained even when there is a difference in volume of the material led into the respective secondary reaction chambers between the plungers P-1 and P-2 (that is, when the positions to which the plungers advance are various). Besides, inasmuch as it is so devised as to secure the uniformity in volume of the material to be extruded by controlling the speed by virtue of the movements of the double plunger, it has also the merit that the transfer valve can be of simple structure and suffices to make simple motions. Moreover, because of separate provision of the pressure-oil circuit for the plungers and the pressure-oil circuit for the screw and transfer valve, it is convenient for maintenance, minimizes the occurrence of troubles and ensures a stable operation.

What is claimed is:

1. A method of cross-linking and extrusion molding a cross-linkable resin selected from the group consisting of polyolefin resin and polyvinyl chloride resin, comprising repeatedly carrying out the cycle of steps of:

1. within a main reaction chamber having a rotatable and axially reciprocatable plasticizing screw therein, feeding said resin and an amount of cross-linking agent capable of cross-linking said resin into said main reaction chamber and therein rotating said screw and simultaneously imposing a back pressure on said screw to resist retracting axial movement thereof so that rotation of said screw melts and kneads said resin and distributes the cross-linking agent uniformly therein to form a plasticized mixture thereof and forwards the plasticized mixture into the forward end of said main reaction chamber, and the accumulation of said plasticized mixture in said forward end of said main reaction chamber forces said screw to retract in said main reaction chamber against said back pressure, stopping the rotation of said screw when said screw has retracted to a predetermined retracted position in said main reaction chamber and continuing to apply said back pressure on said screw whereby a charge of plasticized material is present in the forward end of said main reaction chamber and is subjected to said back pressure, the temperature and pressure applied on said plasticized mixture in the main reaction chamber being insufficient to cause the cross-linking reaction to occur so that the charge of plasticized material is not cross-linked;

2. simultaneously with the retracting movement of said screw, advancing at a constant maximum speed a reciprocatable first plunger in a first secondary reaction chamber which is isolated from said main reaction chamber and is filled with a charge of previously plasticized material undergoing cross-linking to discharge the latter charge from said first secondary reaction chamber through a transfer valve and thence through an extrusion die to form an extrusion molding;

3. while said first plunger is still advancing at said constant speed, advancing said screw axially in said main reaction chamber to discharge therefrom the first-mentioned charge of plasticized material and feeding said first-mentioned charge of plasticized material through said transfer valve into a second secondary reaction chamber which is isolated from said extrusion die and has a reciprocatable second plunger therein and located close to the forward end of said second secondary reaction chamber, and simultaneously applying a second back pressure on said second plunger less than the pressure applied to advance said screw so that the plasticized material from said main reaction chamber forces said second plunger to retract against said second back pressure and fills said second secondary reaction chamber and is continuously subjected to pressure, and terminating advancing movement of said screw when it reaches a predetermined advanced position in said main reaction chamber;

4. when said first plunger reaches a predetermined intermediate advanced position in said first secondary reaction chamber, reducing the speed of advancing movement of said first plunger from said constant maximum speed toward zero, and simultaneously initiating advancing movement of said second plunger at a speed increasing from zero toward said constant maximum speed, and simultaneously shifting said transfer valve to place both of said first and second secondary reaction chambers in communication with said die whereby the extrusion molding continuously being formed at this time consists of plasticized material supplied from both of said secondary reaction chambers, the speeds of the first and second plungers being coordinated with each other so that the total amount of plasticized material extruded through the die per unit time is substantially equal to the amount extruded during said constant maximum speed advance of said first plunger;

5. when said first plunger reaches a predetermined final advanced position in said first secondary reaction chamber, stopping advancing movement of said first plunger, and simultaneously establishing advancing movement of said second plunger in said second secondary reaction chamber at said constant maximum speed, and simultaneously shifting said transfer valve to place said second secondary reaction chamber in communication with said extrusion die and out of communication with said main reaction chamber and to place said first secondary reaction chamber in communication with said main reaction chamber and out of communication with said extrusion die, whereby the extrusion molding continues to be formed by the plasticized material from said second secondary reaction chamber; and 6. then restarting rotation of the screw and repeating steps 1 to 5 with the operations of the first and second cylinders being reversed.

* * * * *